United States Patent [19]

Emrick

[11] 3,787,327

[45] Jan. 22, 1974

[54] PROCESS FOR MANUFACTURING MINUTE CAPSULES HAVING POLYNITRILE CAPSULE WALLS

[75] Inventor: Donald D. Emrick, Kettering, Ohio

[73] Assignee: The National Cash Register Company, Dayton, Ohio

[22] Filed: Feb. 22, 1972

[21] Appl. No.: 228,228

[52] U.S. Cl......... 252/316, 106/308 M, 106/308 N, 117/100 A, 252/364, 264/4, 424/33
[51] Int. Cl............................. B01j 13/02, B44d 1/02
[58] Field of Search... 252/316; 117/100 A; 424/33; 264/4

[56] References Cited
UNITED STATES PATENTS

| | | | |
|---|---|---|---|
| 2,800,457 | 7/1957 | Green et al. | 252/316 |
| 3,455,848 | 7/1969 | Yoncoskie et al. | 252/316 X |
| 3,523,906 | 8/1970 | Vrancken et al. | 252/316 |
| 3,607,775 | 9/1971 | Yoshida et al. | 252/316 |

Primary Examiner—Richard D. Lovering
Attorney, Agent, or Firm—E. Frank McKinney; Robert J. Shafer

[57] ABSTRACT

A process is disclosed by which minute capsules can be manufactured, en masse, and wherein the capsule wall material includes a polymeric nitrile composition. The process is disclosed to be one of liquid-liquid phase separation of the polymeric nitrile capsule wall material and the phase separation is disclosed to be accomplished from a vehicle of an aqueous solution relatively concentrated in inorganic salt. The phase separation is accomplished by diluting the vehicle to a point where the nitrile polymer is no longer soluble.

2 Claims, No Drawings

PROCESS FOR MANUFACTURING MINUTE CAPSULES HAVING POLYNITRILE CAPSULE WALLS

BACKGROUND OF THE INVENTION

1. Field of the Invention

It is an object of the present invention to manufacture minute capsules, en masse, from an aqueous liquid manufacturing vehicle. It is a particular object to provide such a process wherein the capsule wall material includes a normally water insoluble or hydrophobic nitrile polymer and wherein the capsule walls are deposited as a result of liquid-liquid phase separation. The process of this invention utilizes a liquid manufacturing vehicle which is an aqueous solution relatively highly concentrated in inorganic salt and, optionally, includes hydrophilic polymeric materials as stabilizing agents for a separated phase of the intended capsule wall material. A more particular object of the process is to provide a liquid-liquid phase separation of polyacrylonitrile and polymethacrylonitrile as capsule wall materials wherein the phase separation is accomplished by carefully controlled dilution of the capsule manufacturing vehicle. The intended capsule core material is selected to be substantially insoluble in the manufacturing vehicle and unreactive with the component parts of the encapsulating system and the process finds particular utility in encapsulating and retaining solid and liquid materials only difficulty contained by processes of the prior art.

2. Description of the Prior Art

Encapsulation by liquid-liquid phase separation has been disclosed in the prior art in a variety of processes. U.S. Pat. No. 3,415,758 issued Dec. 10, 1968 to the assignee herein, discloses an encapsulation process wherein a first hydrophobic polymeric material is caused to undergo liquid-liquid phase separation in a nonaqueous capsule manufacturing vehicle by addition, to the system, of a complementary second, hydrophobic polymeric material.

U.S. Pat. No. 2,800,457 issued July 23, 1957 to the assignee herein, discloses an encapsulation process wherein complex coacervation of hydrophilic polymeric materials is accomplished by dilution of an aqueous solution. The process of that patent requires at least two water-soluble polymeric materials, all of which carry some electrostatic charge to enable the complex coacervation to occur.

U.S. Pat. No. 2,923,694, issued Feb. 2, 1960 on the application of W. Schmidt discloses spinning threads of polyacrylonitrile materials from a concentrated aqueous salt solution into an aqueous coagulating solution. Such disclosure, however, is not suggestive of liquid-liquid phase separation or of encapsulation.

U.S. Pat. No. 2,404,722 issued July 23, 1946 on the application of R. C. Houtz discusses preparation of polyacrylonitrile solutions using various cyclic sulfoxides at temperatures preferably below 250° centrigrade. There is also a discussion therein of spinning baths of aqueous salt solutions which are said to coagulate the polacrylonitrile on contact, the yield fibers or ribbons or the like; but there is no hint of a process of liquid—liquid phase separation.

An article by G. E. Ham in Industrial and Engineering Chemistry, Volume 46, No. 2 at 390–392 (1954) contains discussion of the difficulties surrounding discovery and selection of solvent compositions for use with polyacrylonitrile. Inorganic salt solutions receive only a cursory mention and then only to note that such solutions are unsatisfactory. There is no mention of liquid-liquid phase separation using any kind of solvent.

SUMMARY OF THE INVENTION

The process of the present invention pertains to a manufacture, en masse, of minute capsules from an aqueous liquid capsule manufacturing vehicle. An important feature of the invention is that the capsule walls are made from polynitrile polymeric material which material is tough, relatively inert and exhibits excellent impermeability to diffusion. The polynitrile materials are generally unaffected by water and organic solvents and, as the capsule wall materials are not dissolved or even swollen by most solvents, the process for manufacturing the capsules amounts to an important advancement in the art of encapsulation. The capsule manufacturing process of this invention is one of liquid-liquid phase separation of the capsule wall material from solution in a manufacturing vehicle. The process, generally, includes: establishing an agitated aqueous capsule manufacturing vehicle of the capsule wall material dissolved in a relatively concentrated solution of an inorganic salt material; dispersing intended capsule internal phase material into the manufacturing vehicle; and diluting the capsule manufacturing vehicle to cause liquid-liquid phase separation of the capsule wall material and consequent wetting and enwrapping of the dispersed capsule internal phase material by phase-separated capsule wall material, to yield capsules.

The process can also be described as one of only two steps wherein dissolving the capsule wall material in a relatively concentrated aqueous inorganic salt solution and dispersing the intended capsule internal phase in the vehicle, are treated as a first step of establishing an agitated two-phase encapsulating system; and a second step is found in diluting that established system to yield liquid-liquid phase separation and consequent wetting and enwrapping of the mobile, dispersed, entities of intended capsule core material to produce capsules.

The separated liquid phase of capsule wall material which deposits onto intended capsule core entities by wetting and enwrapping those entities is solidified as the dilution of the phase separation step is continued. The solidification can be completed by additional dilution.

The polymeric capsule wall material has been indentified herein as polynitrile and the preferred materials are polyacrylonitrile and polymethacrylonitrile. Other eligible polymeric materials include copolymers of acrylonitrile, methacrylonitrile, fumaronitrile, itacononitrile and nitrile copolymers manufactured from the foregoing nitrile monomers and one or more monomers containing polymerizable vinyl, acrylate or methacrylate functionality, said copolymers containing a minimum of 35 percent, by weight, of nitrile functional (—CN) groups (hydrolyzable to ammonia). Non-limiting examples of such suitable co-monomers include vinylpyridine, ethyl actylate, methyl methacrylate, and lauryl methacrylate. The only substantial requirement of such materials, other than that they be adequately soluble in the aqueous capsule manufacturing vehicle, is that the molecular weight be great enough that a film of the material will exhibit the desirable capsule wall characteristics of toughness and impermeability. Although a molecular weight limit is a matter of judgment and may vary from one encapsulating situation to another, it is believed that the polynitrile should have a molecular weight greater than about 40,000.

The polynitriles are noted for generaly insolubility in normally-used solvents; and in developing an encapsulating process, particular attention must be applied to discovering a solvent which dissolves the polynitrile and yet does not dissolve or react with an intended capsule internal phase material. The desired capsule internal phase of this invention is substantially water insoluble and the capsule manufacturing vehicle is selected to be aqueous. Highly concentrated aqueous solutions of very soluble inorganic salts are found to be successful as solvents for the polynitriles. Preferred examples of such salts include zinc bromide, lithium bromide, potassium thiocyanate, sodium thiocyanate, calcium thiocyanate, zinc chloride, sodium perchlorate, calcium nitrate, and quaternary ammonium salts. The amount of inorganic salts to be used in this encapsulating process is difficult to particularly specify because it depends upon several characteristics of the encapsulating system. Alteration in such system parameters as temperature and molecular weight of the polymer will permit use of different concentrations of salt. Also, the nature of the salt itself will play a role in the concentration required for optimum results. The upper limit for concentration of an inorganic salt is saturation at the encapsulation conditions and the lower limit is that concentration required to achieve solution of the polynitrile material. For example, a concentration of about 50–60 percent, by weight, has been found adequate for aqueous zinc chloride solutions and for sodium thiocyanate a concentration of about 6–8 Molar (about 40–51 percent, by weight) has performed well in the process of this invention. A salt concentration of greater than about 40 percent, by weight, is required for acceptable results.

The phase separation of this invention is accomplished by dilution of the capsule manufacturing vehicle to a salt concentration below that concentration which is adequate to maintain solution of the polynitrile. Such dilution has generally been known in the prior art relating to processes to spin solid threads or yarn. The phase transition in that thread spinning does not include or require a liquid phase of the fluid character necessary to manufacture capsules. The preferred phase separation of this invention is conducted in the presence of a hydrophilic polymer material dissolved in the vehicle. The hydrophilic polymer, while not actually required for the manufacture of capsules, is believed to aid in maintaining the fluidity of the separated phase of polynitrile. Dilution of the vehicle by use of water alone and in the absence of hydrophilic polymeric material causes the polynitrile polymer to be separated from solution and rapidly transformed to a solid state. For reasons not entirely understood, dilution in the presence of a hydrophilic polymeric material appears to temporarily increase fluidity of the separated phase of capsule wall material. The hydrophilic polymeric material can be added along with the dilution water or it can be initially present in the encapsulating vehicle. The hydrophilic polymeric material can be any which is adequately soluble in the encapsulating vehicle and which does not react or complex with the intended capsule internal phase or with the polynitrile capsule wall material. Examples of eligible hydrophilic polymeric materials include: gum arabic; gelatin; dextran; poly(vinyl alcohol); larch tree polysaccharide (sold under the tradename, "Stractan AF" by Stein, Hall and Co., Des Plaines, Illinois, U.S.A.); poly(vinylpyrrolidone); poly(ethylene glycol); dextrin polysaccharide (sold under the tradename "Capsul" by National Starch and Chemical Company, New York, N.Y. U.S.A.); methyl cellulose; and combinations of those materials. The limitations in amount of hydrophilic polymeric material used in this limitations in amount of hydrophilic polymeric material used in this process are simple matters of practical consideration. Of course, the process can be conducted with no hydrophilic polymer and whatever amount of hydrophilic polymer is used will, to that extent, aid in performance of the process. The upper limit for use of hydrophilic polymer appears to be the amount which increases the viscosity of the vehicle to the point where the system is not practically manageable. The most preferred of the hydrophilic polymeric materials are those which cause only a modest increase in the viscosity of the encapsulating system. A weight ratio comparison of hydrophilic polymer to polynitrile can be used as one indicator of the preferred amount of hydrophilic polymeric material. A ratio as high as about 10 has been found operable, with a ratio of about 2 to 4 being most commonly used.

Certain materials can be added to the encapsulating system to aid the capsule wall material in wetting the dispersed capsule internal phase materials. The use of these wetting aids is optional and not required. The wetting aids can be added to either the capsule core material or to the manufacturing vehicle. Examples of wetting aid materials include: acetone; methanol; ethylene carbonate; 3,3'-thiodipropionitrile; acetonitrile; phthalonitrile; adiponitrile; gum damar; and the like.

Capsule internal phase material in capsules of the present invention can be any of a multitude of different kinds and types of materials. The most important criteria in selection of the materials which are eligible for use as the internal phase of capsules herein are: (a) that the intended internal phase material be substantially water insoluble and (b) that the intended capsule internal phase material be substantially non-reactive with other components of the capsule or coacervate film manufacturing system. A few of the materials which can be utilized as capsule internal phases include, among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water insoluble metallic oxides and salts; fibrous materials, such as cellulose or asbestos; substantially water insoluble synthetic polymeric materials; minerals; pigments; glasses; activated charcoal; elemental materials, including solids, liquids and gases; flavors; fragrances; reactants; biocidal compositions; physiological compositions; fertilizer compositions; and the like. In short, the materials which can be contained in capsules manufactured by the process of the present invention can differ not only among themselves in their physical state, which can be solid, liquid, gas, or combinations thereof, but can differ in their chemical composition and in their intended use. The capsule wall materials provide protection for the capsule internal phase materials, such as, protection from ambient conditions, protection from oxidation or ultraviolet radiation, protection from evaporation, from crystallization in solution, and the like. Of course, to the extent that they are insoluble in the capsule manufacturing vehicle, other, previously made, capsules can be encapsulated.

Capsules made according to the process of the present invention have seamless walls and are not limited either as to size or as to internal phase contents. The borad variety of internal phase contents was hereinabove disclosed and the size range of capsules made by the present invention can extend from a lower limit of a few to several microns up to a larger limit of many thousand microns in average diameter. The usual size for capsules made according to the present process are from about one or two microns to about 2,500 microns in average diameter. Capsules of the aforementioned size are considered to be minute and are preferred. The most usual size for capsules manufactured according to the present invention is within a range of from about two microns up to about 250 microns. Capsules made according to the present invention can be made to contain a range of amounts of internal phase material. The capsules can contain from 0 to more than 99 percent, by weight, of the internal phase material. The most usual and preferred range for the amount of material to be contained in capsules manufactured according to the present invention is from about 50 to about 97 percent, by weight. The aforementioned capsules having zero contents are considered to be minute entities of polymeric material and can be manufactured by the process of the present invention by omitting the intended internal phase material.

The invention having been disclosed in a general manner, specific embodiments of the invention will be described with respect to preferred practice of the process. It will be understood that the examples, by their diversified nature, are intended to demonstrate the broad scope of the invention rather than to limit it in any way.

DESCRIPTION OF PREFERRED EMBODIMENTS

Example 1

In this example the capsule internal phase material is dioctyl phthalate and the capsule manufacturing vehicle is aqueous 6 Molar sodium thiocyanate solution. The encapsulation is conducted at about 25° centigrade. The nitrile polymer capsule wall material is polymethacrylonitrile having a viscosity average molecular weight*(*viscosity average molecular weight determination is described by Overberger et al., J. Polymer Sci., Vol. 43 at pp. 109–120 (1959).) of approximately 1.95 to $10^7$. The polymethacrylonitrile is prepared by emulsion polymerization at 50 degrees centigrade and in accordance with the procedure described by Sorenson and Campbell at page 185 et seq. in "Preparative Methods of Polymer Chemistry," Interscience Publishers, Inc., New York (1961).

To prepare the encapsulating system, 25 milliliters of dioctyl phthalate is dispersed into a solution of 2.1 grams of the polymethacrylonitrile in 120 milliliters of the sodium thiocyanate solution and 20 milliliters of acetone. Use of the acetone is optional and not required-;—it being believed, as hereinbefore disclosed, that the acetone aids in causing phase-separated liquid capsule wall material to wet and enwrap droplets of intended capsule internal phase. Agitation of the system is adjusted to yield dioctyl phthalate droplets about 100–200 microns in diameter. To the two-phase system of intended capsule internal phase dispersed in capsule manufacturing vehicle is added, over a period of 25 minutes, 60 milliliters of a solution of 6.5 grams of gum arabic in aqueous 5 Molar sodium thiocyanate solution. It should be noted that phase separation does not occur at that point and that the gum arabic is used as an aid in maintaining and stabilizing the separated phase in a fluid state when the phase separation is accomplished. To cause phase separation and the consequent encapsulation, 360 milliliters of distilled water is added in a dropwise manner over a duration of about 1 hour. During that time, the polynitrile capsule wall material sequentially: separates from solution as a liquid, wets and enwraps the dispersed droplets, and gels to yield completed capsules having at least semi-solid polymethacrylonitrile walls. To render the capsule walls even more solid, an additional 700 milliliters of water is added to the agitating system. Capsules are separated from the vehicle by simple filtration, are washed with water and dried. The yield is about 17 grams of capsules.

Example 2

The encapsulating system of this example is identical with that of Example 1 as to the kinds and amounts of materials with the exception that trichlorobiphenyl (bearing a trademark designation of "Arochlor 1242" and sold by the Monsanto Chemical Co., St. Louis, Missouri, United States of America) is substituted, volume-for-volume, for the dioctyl phthalate and 2.4 grams of the polynitrile are used rather than 2.1 grams. At about 25 degrees centigrade, agitation is adjusted to yield intended capsule internal phase droplets about 100–500 microns in diameter. Over a period of about 30 minutes, 60 milliliters of a solution of 6 grams of gelatin in aqueous 8 Molar sodium thiocyanate is added dropwise followed by dropwise addition of 60 milliliters of aqueous 2 Molar sodium thiocyanate. The gelatin is of a high Bloom strength, acid extracted, pigskin variety and performs the same function as the gum arabic of Example 1. Dilution to cause phase separation in this example is accomplished using the 2 Molar sodium thiocyanate solution. To further solidify the capsule walls, 200 milliliters of water are added over a duration of about 30 minutes. The resulting system of capsules is warmed to about 55° centigrade and the agitation is continued for about 15 minutes after which the entire system is poured into 1,000 milliliters of warm water and the capsules are then recovered by simple filtration. The yield is about 35 grams of capsules.

EXAMPLE 3

In this example, the following are combined under conditions of agitation: 4 grams of the polynitrile material of Example 1, above, and 7 grams of gum arabic, both dissolved in 180 milliliters of aqueous 6 Molar sodium thiocyanate; 15 milliliters of acetone; and 20 milliliters of dioctyl phthalate. Agitation is adjusted to yield droplets of dioctyl phthalate about 50–200 microns in diameter. To accomplish phase separation in this two-phase system of intended capsule core droplets dispersed in the solution of capsule wall material, 60 milliliters of aqueous 2 Molar sodium thiocyanate is added in dropwise fashion over a period of about 1 hour. It appears that substantially all of the polynitrile capsule wall material is separated from solution after about 30 milliliters of the diluting solution has been added. In a duration of about 30 minutes, 200 milliliters of water are added to the system; and then the entire system is added to 1,000 milliliters of water as in Example 2, above. The yield is about 20 grams of capsules. This example differs especially from the previous examples in that, with the exception of the diluting solution, all components of the encapsulating system are combined at the same time.

Example 4

The capsule internal phase of this example is orthodichlorobenzene and the capsule manufacturing vehicle is aqueous 6 Molar sodium thiocyanate solution. The following are combined at about 25° centigrade with agitation: 1.9 grams of the polynitrile material of Example 1, above, dissolved in 180 milliliters of aqueous 6 Molar sodium thiocyanate; 20 milliliters of acetone and 2.5 milliliters of 3,3'-thiodipropionitrile. Agitation is adjusted to yield droplets of ortho-dichlorobenzene about 200-500 microns in diameter. To accomplish phase separation in this two-phase system of intended capsule core droplets dispersed in the solution of capsule wall material, 360 milliliters of water is added, in dropwise fashion, over a period of about 90 minutes. Then, in a duration of less than 30 minutes, 750 milliliters of water is added to the system to more completely harden the polynitrile capsule wall material which has been previously substantially completely phased out of solution. The capsule product is recovered by simple filtration after several washes in water. This example differs from previous examples in that hydrophilic polymeric material as separated phase stabilizing agents are not used.

Example 5

In this example, the capsule internal phase material is decalin and the capsule manufacturing vehicle is aqueous 6 Molar sodium thiocyanate solution. Polymethacrylonitrile is used as the capsule wall material and has a viscosity average molecular weight of about $4.91 \times 10^6$. The polymethacrylonitrile of this example is prepared by emulsion polymerizing 202 grams of methacrylonitrile, 6.9 grams of lauryl methacrylate and 5.0 grams of vinylpyridine at about 50 degrees centigrade. Into a vessel equipped for agitation are placed: 3.6 grams of the above-mentioned polymethacrylonitrile and 7.2 grams of gum arabic, both dissolved in 270 milliliters of aqueous 6 Molar sodium thiocyanate solution; 25 milliliters of acetone; and 25 grams of the decalin capsule internal phase. For use in this example, the decalin contains 2 percent, by weight, gum damar. Gum damar in the capsule internal phase serves the same purpose as the wetting aids included in the vehicle. Their use in either phase promotes wetting and enwrapping of capsule core droplets to yield capsules. 3,3'-thiodipropionitrile is also eligible for use as a wetting aid as are hydrophilic polymeric materials to the extent that they are soluble in the capsule internal phase material. As previously stated, the use of wetting aids is optional and not required.

The phase separation is accomplished at about 45° centigrade by dropwise addition of about 175 milliliters of warmed, aqueous 2 Molar sodium thiocyanate solution over a duration of about 2 hours. Subsequently, 300 milliliters of water is added to the system to further solidify the capsule walls previously formed by addition of the dilute thiocyanate solution. The resulting capsule slurry is poured into 1000 milliliters of water and the capsules are separated from the vehicle liquid by simple filtration.

Example 6

The capsule internal phase material of this example is ortho-dichlorobenzene, the capsule manufacturing vehicle is 64 percent, by weight, aqueous zinc chloride and the capsule wall material is partially stereoregular polymethacrylonitrile having an estimated viscosity average molecular weight of about $10^4$–$10^5$. The stereoregular polymethacrylonitrile is prepared in the manner of Joh and coworkers described in the Journal of Polymer Science, Part A-1, Vol. 5 at pages 605–617 (1967). In essence, the polymerization of methacrylonitrile is conducted at about $-70$ to $-80$ degrees centigrade in the presence of n-butyl lithium and n-butyl magnesium chloride; and the resulting polymeric product is only approximately 35 percent, by weight, soluble in acetone at 25° centigrade.

Preparation of the encapsulating system is accomplished by combining the following at about 55° centigrade to yield a solution: 9 grams of the above-specified polymethacrylonitrile, 8 grams of gum arabic and about 150 milliliters of 64 percent, by weight, aqueous zinc chloride solution. In this example, liquid-liquid phase separation is accomplished prior to addition of the intended capsule internal phase material. The phase separation is brought about by dropwise addition of about 30 milliliters of water having dissolved therein about 3 grams of gum arabic. The relatively large amount of gum arabic in this example enables the maintenance of a liquid separated phase throughout the dilution step, as previously disclosed, above. To the two-phase system, agitating and maintained at about 55° centigrade, is added 60 milliliters of ortho-dichlorobenzene and the agitation is adjusted to yield droplets about 50 microns in average diameter. Agitation of the system is continued to enable wetting and enwrapping of the dispersed droplets and formation of capsules. In this example, where the capsule system is in a delicate balance between fluid and solid capsule walls and where there is a tendency for the capsules to agglomerate into a useless mass, the phase separation is completed and the capsule wall are further solidified by cautious and dropwise addition of 10 milliliters of water over a duration of about 30 minutes. Subsequent to that cautious addition, about 250 milliliters more of water is added dropwise to render the capsule walls more solid and the system is then poured into 1,000 milliliters of water and the capsules separated therefrom by simple filtration.

EXAMPLE 7

In this example, cottonseed oil is encapsulated using a polyacrylonitrile prepared in general accordance with the procedures described and referenced in Examples 1 and 5, above. The polyacrylonitrile exhibited a viscosity average molecular weight of about $2.6 \times 10^5$. A method for making polyacrylonitrile is described at pages 168–169 of the book by Sorenson and Campbell cited in Example 1. To prepare the encapsulating system, the following are combined to yield a dispersion of cottonseed oil in a solution of polymeric material: 4.6 grams of the polyacrylonitrile and 9 grams of gum arabic dissolved in about 175 grams of aqueous 8 Molar sodium thiocyanate and 25 milliliters of cottonseed oil as the intended capsule internal phase. The temperature is adusted to about 5–10 degrees centigrade and the agitation is adjusted to yield internal phase droplets about 50–200 microns in average diameter. To yield phase separation and capsule wall solidification, 150 milliliters of water, in which is dissolved about 16 grams of gum arabic, is added dropwise over a duration of about 45 minutes. Next, an additional 150 milliliters of water is added over about 20 minutes and then the entire capsule system is poured into 1,000 milliliters of water. The capsules are recovered by simple filtration.

Example 1-dodecyl alcohol is encapsulated by polyacrylonitrile having a viscosity average molecular weight of about $1.19 \times 10^6$. The encapsulating system is assembled by dissolving 4 grams of the polyacrylonitrile and 9 grams of gum arabic into 150 milliliters of aqueous 58 percent, by weight, zinc chloride solution and dispersing 25 milliliters of 1-dodecyl alcohol into the solution as the intended capsule internal phase. The temperature is maintained at about 25 degrees centigrade and the agitation is adjusted to yield droplets of internal phase about 50–200 microns in average diameter. Phase separation, capsule wall solidification and capsule isolation is accomplished in this example as it was accomplished in Example 7, above.

Example 9

Xylene is encapsulated by polyacrylonitrile having a viscosity average molecular weight of about $6.16 \times 10^5$ and prepared according to the general polymerizing technique set out in Example 6, above. The encapsulating system is established by combining about 8 grams of the polyacrylonitrile, 20 grams of gum arabic, 25 grams of 3,3'-thiodipropionitrile (as a wetting agent), 61 grams of xylene and about 250 milliliters of aqueous 8 Molar sodium thiocyanate. With the system at a temperature of about 25 degrees centigrade and the agitation adjusted to provide droplets about 50–200 microns in diameter, about 300 milliliters of water are added in dropwise fashion over a duration of about 100 minutes. The system, with its resultant capsules containing xylene, is then poured into about 1,000 milliliters of water to harden the capsule walls and the capsules are separated by filtration.

What is claimed is:

1. A process for manufacturing minute capsules, en masse, in an aqueous liquid vehicle comprising the steps of:
   a. establishing an agitated, two-phase system of minute mobile entities of substantially water-insoluble intended capsule core material dispersed in an aqueous capsule manufacturing vehicle solution of polynitrile capsule wall material wherein the polynitrile capsule wall material has a viscosity average molecular weight of greater than about 40,000 and is selected from the group consisting of polyacrylonitrile, polymethacrylonitrile, and copolymers of acrylonitrile, methacrylonitrile, fumaronitrile, itacononitrile, and monomers containing polymerizable vinyl, acrylate and methacrylate, said copolymers containing at least 35 percent, by weight, nitrile groups and the solution is concentrated to more than about 40 percent, by weight, of an inorganic salt to maintain the polynitrile material in solution and
   b. diluting the capsule manufacturing vehicle by addition to the vehicle of aqueous liquid
   whereby the polynitrile capsule wall material is separated from solution as a liquid phase which wets and enwraps the intended capsule core entities to yield capsules.

2. A process for manufacturing minute capsules, en masse, in an aqueous liquid vehicle comprising the steps of:
   a. establishing an agitated aqueous capsule manufacturing vehicle of a solution of polynitrile capsule wall material wherein the polynitrile capsule wall material has a viscosity average molecular weight of greater than about 40,000 and is selected from the group consisting of polyacrylonitrile, polymethacrylonitrile, and copolymers of acrylonitrile, methacrylonitrile, fumaronitrile, itacononitrile, and monomers containing polymerizable vinyl, acrylate and methacrylate, said copolymers containing at least 35 percent, by weight, nitrile groups and the solution is concentrated to more than about 40 percent, by weight, of an inorganic salt;
   b. dispersing in that vehicle, minute entities of substantially water insoluble intended capsule internal phase material;
   c. diluting the vehicle with an aqueous liquid to cause liquid-liquid phase separation of the capsule wall material which liquid separated phase individually deposits onto the entities of intended capsule internal phase to yield capsules and
   d. adding additional aqueous liquid to more completely solidify the deposited capsule walls.

* * * * *